United States Patent
Murphy et al.

(10) Patent No.: US 6,205,718 B1
(45) Date of Patent: Mar. 27, 2001

(54) MEANS FOR FORMING BOTH FLUID AND INSECT BARRIERS, WHEREAT STRUCTURAL UNITS ARE ADJOINED

(76) Inventors: Joseph M. Murphy; David R. Murphy, both of 53 Meadows Rd., Lafayette, NJ (US) 07848

(*) Notice: Subject to any disclaimer, the term of this patent is extended or adjusted under 35 U.S.C. 154(b) by 0 days.

(21) Appl. No.: 09/255,475

(22) Filed: Feb. 23, 1999

(51) Int. Cl.$^7$ ........................................ A01K 3/00
(52) U.S. Cl. .............. 52/101; 43/124; 43/132.1; 43/136
(58) Field of Search ................. 52/101; 43/124, 43/132.1, 136

(56) References Cited

U.S. PATENT DOCUMENTS

| | | | |
|---|---|---|---|
| 3,826,036 | * 7/1974 | Neugebauer | 43/132.1 |
| 4,876,823 | * 10/1989 | Brunetti | 43/124 |
| 5,022,179 | * 6/1991 | Olson | 43/114 |
| 5,233,787 | * 8/1993 | Anderson | 43/132.1 |
| 6,094,857 | * 8/2000 | Kennedy | 43/132.1 |

* cited by examiner

*Primary Examiner*—Carl C. Friedman
*Assistant Examiner*—Kevin McDermott
(74) *Attorney, Agent, or Firm*—Bernard J. Murphy

(57) ABSTRACT

The well-known, compliant sheet of material which is enwrapped about the juncture of structural units, to form a fluid barrier thereat, has its structure-adhering adhesive admixed with an insecticide or termiticide, to additionally form an insect barrier thereat as well. In an alternate embodiment the insecticide or termiticide is sprayed onto the adhesive.

10 Claims, 1 Drawing Sheet

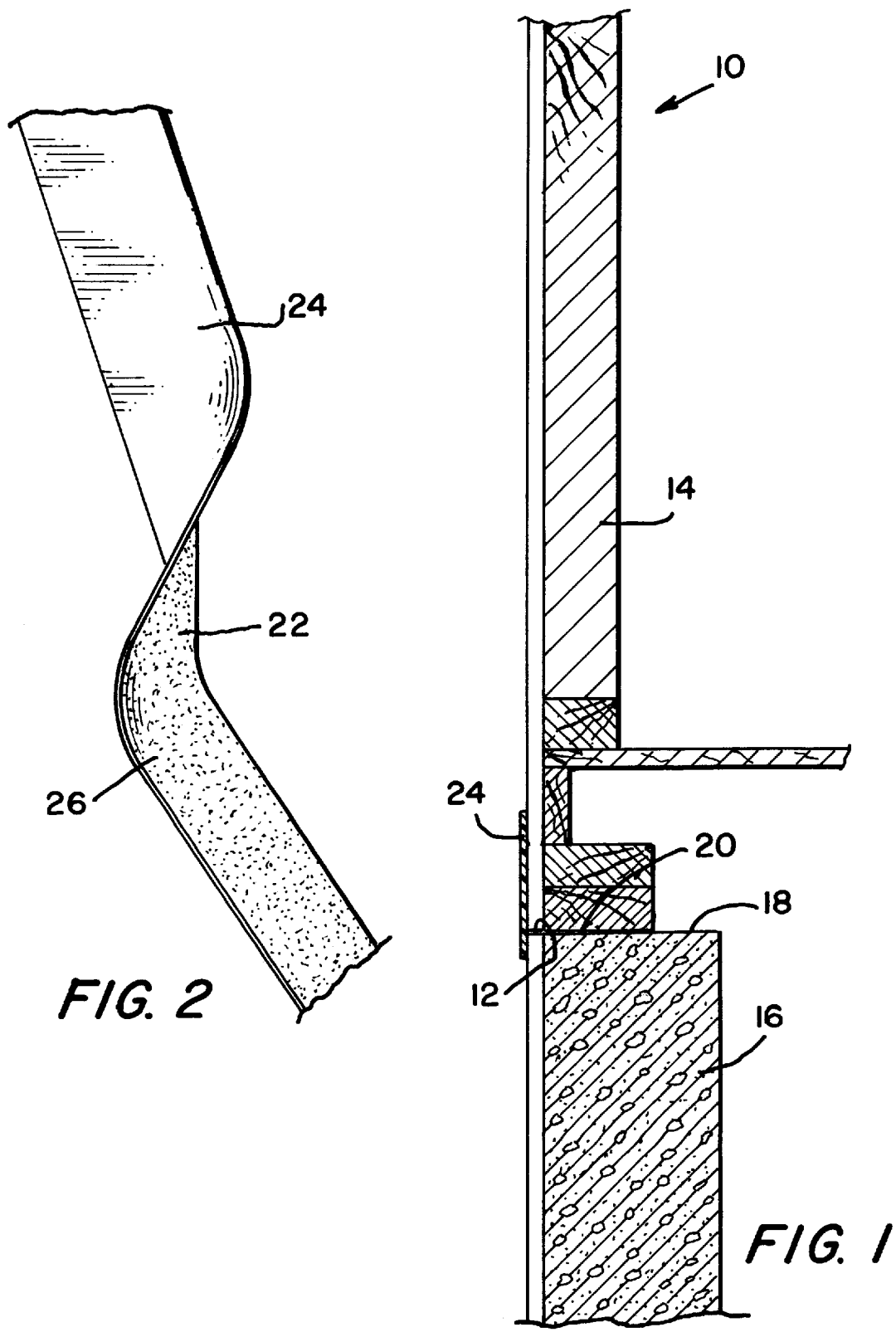

MEANS FOR FORMING BOTH FLUID AND INSECT BARRIERS, WHEREAT STRUCTURAL UNITS ARE ADJOINED

This invention pertains to building materials and supplies, and in particular to films or sheets of compliant material which are used, in construction sites, to form fluid barriers whereat structural units are adjoined. For example, in home construction, a poured foundation, or a cinder block foundation, receives thereupon the wooden construction of the framed house and its sheathing, and the framed and sheathed structure defines a gap with the foundation. To prevent the entry of rain, snow, hail and the like from entering the structure, at the aforesaid gap, it is a common practice to close off the gap with an extended sheet of compliant material. The sheet of material is set in circumscription of the gap, fully thereabout, and is fixed in place by adhesive borne on the structure-interfacing surface of the material. Subsequently, exterior siding, of whatever nature or material, is emplaced over the house sheathing and the gap-covering sheet of material.

In that foundations are fixed in the earth, they are susceptible of conducting insects, such as termites, therealong, into the surmounting structure.

It would satisfy a long-felt need, if there were some way of utilizing the gap-covering, barrier material, additionally, for providing a barrier to the travel of insects thereupon.

In the prior art, especially as disclosed in U.S. Pat. No. 5,417,017, to Vasilios Toutountzis, on May 23, 1995, for "Termite Control", and U.S. Pat. No. 5,704,172, issued on Jan. 6, 1998, to Brad Gougeon, et al, for "Rigid Foam Board and Foundation Insulation System and Method for Treating Same with Insecticide/Termiticide", there are systems and methods for controlling insects. However, they are quite complex and expensive, and constitute means which are, necessarily, independent of the gap-covering sheet of material which defines a barrier to fluid entry into the gap.

It is an object of this invention to meet the aforesaid long-felt need, by defining how to utilize the yap-covering, fluid barrier material, additionally, as a barrier to the travel of insects thereupon.

Particularly, it is an object of this invention to set forth means for forming both fluid and insect barriers, whereat structural units are adjoined, comprising an extended sheet of compliant material; and means borne on said sheet for causing said sheet to adhere to such structural units; wherein said means comprises means for exterminating insects.

Further objects of this invention, as well as the novel features thereof, will become apparent from the following description taken in conjunction with the accompanying figures, in which: FIG. 1 is a cross-sectional view of a structure which has the novel barrier in place; and FIG. 2 is an illustration of a short length of the sheet which forms the barrier, the same being partially twisted to show obverse and reverse faces thereof. As noted in the foregoing, and in FIG. 1, in home construction 10, there typically obtains a gap 12 between the framed, wooden structure 14 of the house, and the underlying, supporting foundation 16. This arises due to the fact that the poured or cinder block foundation 16 has an uppermost surface 18 which is characterized by a multiplicity of irregularities. The wooden structure 14 does not meld with the foundation surface 18. Accordingly, fully about the foundation 16-to-framed structure 14 there are necessarily openings, like gap 12, which are susceptible of admitting wind, rain, snow, dust, and such. It is a common practice to fix an impervious sheet 24 of compliant material about the foundation-to-framing juncture 20, whereat the gap 12 obtains, to prohibit the entry therethrough of dust, rain, snow, and the like. The sheet of material is fixed to the juncture 20 by means of an adhesive borne on the structure-facing surface thereof.

As noted, there are in the prior art a number of systems, equipments, and methods for controlling insects, to insure that they will not enter a building structure. U.S. Pat. Nos. 5,417,017 and 5,704,172, have been cited as exemplary. Commonly, then, it has been a practice to (a) form a fluid barrier whereat structural units are adjoined, and (b) independently, by other means, form a barrier to insect travel, also whereat structural units are adjoined. The cited objects of this invention teach how to form both barriers with a single undertaking.

It is a teaching of this invention, as shown in FIG. 2, to disperse an insecticide or termiticide in the adhesive 22 which is used to fix the impervious sheet 24 of compliant material, prior to adhering the sheet 24 about the foundation 16-to-framed structure 14. The material of which the sheet 24 is formed may be polytetrafluoroethylene, for example, and the adhesive 22, in a preferred embodiment, is pressure-sensitive adhesive, the latter having a peel-away covering (not shown) thereupon. The sheet 24 of material is factory-coated with the adhesive 22, in which the insecticide or termiticide has been dispersed. At the site, a workman simply removes the peel-away covering, and presses the sheet 24 of adhesive-bearing material onto the structural units whereat they form a structure 20.

With the sheet 24 adhered to the joining surfaces of the structural units, it surely defines a barrier to the entry, into the structural units, of dust, rain, snow, and such. However, with the inclusion of insecticide and/or termiticide in the adhesive 22, there obtains the unexpected benefit of also forming an insect barrier thereat.

The adhesive 22 used is not significant, it simply has to be adequate to the need, and it should be spread about the surface 26 of that face of the sheet 24 which is to adhere to the structural units. The insecticide to be used for exterminating insects and/or termites can be chlorpyrifos, which is marketed under the trademark DURSBAN by DowElanco, Inc. If the insecticide/termiticide is not dispersed in the adhesive 22, in a factory process, it can, optionally, be sprayed onto the adhesive 22, prior to the overlay of the peel-away covering for the sheet 24 of material.

In some circumstances, it may be necessary to permit water vapor which has entered the structures to exit through the sheet 24, to insure that the vapor will not condense in the structures and potentially damage insulation. Material which provides a sheet 24 suitable for this purpose is that which is formed of spunbonded high density polyethylene fibers and sold under the trademark DUPONT TYVEK HOUSEWRAP, by DuPont Company, Wilmington, Del., for example. To accommodate the exiting of water vapor through the sheet 24 the adhesive 22 shall be affixed, to the structure-interfacing surface 26 of the sheet 24, along only the upper and lower edges of the sheet. The sheet will remain impervious to fluid at the opposite surface.

While we have described our invention in connection with specific embodiments thereof, it is to be clearly understood that this is done only by way of example, and not as a limitation to the scope of the invention as set forth in the objects thereof and in the appended claims.

We claim:

1. Means for forming both fluid and insect barriers, whereat structural units are adjoined, comprising:

an extended sheet of compliant material; and means borne on said sheet for causing said sheet to adhere to such structural units; wherein said means comprises means for exterminating insects; and said material comprises means for permitting the passage of water vapor therethrough, from one surface of said sheet to the opposite surface of said sheet, and for prohibiting the passage of liquid, vapor and gas therethrough from said opposite surface of said sheet to said one surface.

2. Means for forming barriers, according to claim 1, wherein:

said sheet-borne means comprises an adhesive.

3. Means for forming barriers, according to claim 1, wherein:

said exterminating means comprises an insecticide.

4. Means for forming barriers, according to claim 1, wherein:

said exterminating means comprises a termiticide.

5. Means for forming barriers, according to claim 1, wherein:

said material comprises means for prohibiting the passage of liquid, vapor and gas therethrough.

6. Means for forming barriers, according to claim 1, wherein:

said sheet-borne means comprises an adhesive; and said adhesive is borne on said one surface of said sheet.

7. Means for forming barriers, according to claim 6, wherein:

said exterminating means comprises an insecticide dispersed in said adhesive.

8. Means for forming barriers, according to claim 6, wherein:

said exterminating means comprises a termiticide dispersed in said adhesive.

9. Means for forming barriers, according to claim 6, wherein:

said exterminating means comprises an insecticide sprayed onto said adhesive.

10. Means for forming barriers, according to claim 6, wherein:

said exterminating means comprises a termiticide sprayed onto said adhesive.

* * * * *